(12) United States Patent
Pikovsky et al.

(10) Patent No.: US 10,364,881 B2
(45) Date of Patent: Jul. 30, 2019

(54) TURBINE ENGINE MODULE COMPRISING A CASING AROUND A DEVICE WITH A COVER FOR RECOVERING LUBRICATING OIL

(71) Applicant: SAFRAN AIRCRAFT ENGINES, Paris (FR)

(72) Inventors: Catherine Pikovsky, Moissy-Cramayel (FR); Benoit Guillaume Farvacque, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 444 days.

(21) Appl. No.: 15/306,969

(22) PCT Filed: Apr. 29, 2015

(86) PCT No.: PCT/FR2015/051162
§ 371 (c)(1),
(2) Date: Oct. 26, 2016

(87) PCT Pub. No.: WO2015/166189
PCT Pub. Date: Nov. 5, 2015

(65) Prior Publication Data
US 2017/0051823 A1    Feb. 23, 2017

(30) Foreign Application Priority Data
Apr. 30, 2014   (FR) ...................... 14 53919

(51) Int. Cl.
*F02C 7/06*       (2006.01)
*F01D 25/18*      (2006.01)
(Continued)

(52) U.S. Cl.
CPC ......... *F16H 57/0486* (2013.01); *F01D 25/18* (2013.01); *F02C 7/06* (2013.01);
(Continued)

(58) Field of Classification Search
CPC .... F02C 7/36; F02C 7/06; F05D 2260/40311; F01D 25/18; F02K 3/06
(Continued)

(56) References Cited

U.S. PATENT DOCUMENTS 3,776,067 A * 12/1973 DeBruyne ............. F16H 1/2818
                                                        184/6.12
4,271,928 A *  6/1981 Northern ................. B64C 27/12
                                                        184/6.11
(Continued)

FOREIGN PATENT DOCUMENTS

FR           2955085 A1    1/2010

OTHER PUBLICATIONS

"Written Opinion," PCT Application No. PCT/FR2015/051162 (dated Nov. 10, 2016).
(Continued)

*Primary Examiner* — Henry Y Liu
(74) *Attorney, Agent, or Firm* — Womble Bond Dickinson (US) LLP

(57) ABSTRACT

The invention relates to a turbine engine module comprising a rotating device (1) having a cover (5), said cover (5) comprising radial through ports (8) for the passage of the oil escaping by centrifugation and means (10) for guiding the oil leaving said ports (8) radially outwards, and a casing (2) defining at least one portion of a lubrication enclosure of said device (1), said casing (2) comprising at least one gutter (13), arranged to recover the oil, characterized in that the gutter (13) comprises an annular bottom wall (12) having at least one discharge port, and in that the casing (2) comprises at least one other port located on the outside of the gutter (13), said at least one other port and said at least one discharge port being connected to common discharge means.

6 Claims, 2 Drawing Sheets

(51) Int. Cl.
*F16H 57/04* (2010.01)
*F16N 31/00* (2006.01)

(52) U.S. Cl.
CPC ....... *F16H 57/043* (2013.01); *F16H 57/0424* (2013.01); *F16N 31/00* (2013.01); *F05D 2220/323* (2013.01); *F05D 2230/237* (2013.01); *F05D 2260/40311* (2013.01); *F05D 2260/609* (2013.01); *F05D 2260/98* (2013.01)

(58) Field of Classification Search
USPC .................................................. 184/6.13
See application file for complete search history.

(56) References Cited

U.S. PATENT DOCUMENTS

| | | | | |
|---|---|---|---|---|
| 6,223,616 | B1* | 5/2001 | Sheridan | F16H 1/2827 184/6.12 |
| 7,704,178 | B2* | 4/2010 | Sheridan | F01D 25/18 475/159 |
| 8,020,665 | B2* | 9/2011 | Sheridan | F01D 25/18 184/6.12 |
| 8,215,454 | B2* | 7/2012 | Portlock | F01D 25/18 184/6.11 |
| 8,333,678 | B2* | 12/2012 | McCune | F01D 25/162 384/276 |
| 8,484,942 | B1* | 7/2013 | McCune | F01D 25/18 184/6.12 |
| 8,740,740 | B2* | 6/2014 | McCune | F01D 5/027 475/159 |
| 8,747,272 | B2* | 6/2014 | Imai | F16H 57/0479 475/159 |
| 8,777,792 | B2* | 7/2014 | Imai | F16H 57/0409 475/159 |
| 8,813,469 | B2* | 8/2014 | Sheridan | F01D 25/16 184/6.12 |
| 8,857,149 | B1* | 10/2014 | Muldoon | F02C 7/06 184/6.11 |
| 8,858,388 | B2* | 10/2014 | McCune | F01D 5/027 475/331 |
| 8,931,285 | B2* | 1/2015 | McCune | F01D 25/18 60/792 |
| 9,341,080 | B2* | 5/2016 | Phillips | F01D 25/18 |
| 9,399,917 | B2* | 7/2016 | Gallagher | F01D 5/14 |
| 9,404,381 | B2* | 8/2016 | NguyenLoc | F01D 15/12 |
| 9,416,677 | B2* | 8/2016 | Munsell | F01D 15/12 |
| 9,476,321 | B2* | 10/2016 | Haugh | F02C 7/14 |
| 9,695,751 | B2* | 7/2017 | Kupratis | F02K 3/072 |
| 9,701,415 | B2* | 7/2017 | Kohlenberg | B64D 33/04 |
| 9,745,862 | B2* | 8/2017 | Sheridan | F01D 25/18 |
| 9,777,595 | B2* | 10/2017 | Sheridan | F01D 25/12 |
| 9,863,326 | B2* | 1/2018 | Sheridan | F02C 7/36 |
| 9,879,608 | B2* | 1/2018 | Sheridan | F02C 7/16 |
| 9,879,694 | B2* | 1/2018 | Sheridan | F01D 9/041 |
| 9,885,313 | B2* | 2/2018 | Baltas | F02K 1/06 |
| 9,903,227 | B2* | 2/2018 | Cigal | F01D 25/20 |
| 9,909,457 | B2* | 3/2018 | DaCunha | B23K 31/02 |
| 9,909,505 | B2* | 3/2018 | Gallagher | F02C 7/36 |
| 9,926,850 | B2* | 3/2018 | Sheridan | F02C 7/36 |
| 9,926,885 | B2* | 3/2018 | Gallagher | F01D 17/14 |
| 9,957,890 | B2* | 5/2018 | Baker | F02C 7/06 |
| 9,976,437 | B2* | 5/2018 | McCune | F01D 5/027 |
| 9,976,490 | B2* | 5/2018 | Sheridan | F02C 7/36 |
| 10,006,406 | B2* | 6/2018 | Blackwell | F02K 1/09 |
| 10,012,150 | B2* | 7/2018 | Gallagher | F02K 1/06 |
| 10,030,543 | B2* | 7/2018 | Otto | F01D 5/026 |
| 10,035,969 | B2* | 7/2018 | Opalka | C10M 125/02 |
| 10,047,699 | B2* | 8/2018 | Sabnis | F02K 1/52 |
| 10,054,058 | B2* | 8/2018 | Sheridan | F02C 7/36 |
| 10,060,289 | B2* | 8/2018 | Sheridan | B01D 19/0068 |
| 10,060,357 | B2* | 8/2018 | Adams | F02K 3/06 |
| 10,066,734 | B2* | 9/2018 | Sheridan | F16H 57/0486 |
| 10,082,105 | B2* | 9/2018 | McCune | F02K 3/06 |
| 10,107,120 | B2* | 10/2018 | Sanchez | F02C 7/12 |
| 10,107,157 | B2* | 10/2018 | Roberge | F02C 7/06 |
| 10,107,378 | B2* | 10/2018 | Miller | F02C 7/36 |
| 10,113,434 | B2* | 10/2018 | Snyder | F01D 5/22 |
| 10,119,465 | B2* | 11/2018 | Sheridan | F02C 3/107 |
| 10,119,466 | B2* | 11/2018 | Schwarz | F02K 3/06 |
| 10,125,724 | B2* | 11/2018 | Roberge | F02K 3/075 |
| 10,138,809 | B2* | 11/2018 | Schwarz | F01D 25/16 |
| 10,151,240 | B2* | 12/2018 | Muldoon | F01D 11/02 |
| 10,151,248 | B2* | 12/2018 | Sheridan | F02C 7/36 |
| 10,161,409 | B2* | 12/2018 | Sheridan | F01M 11/02 |
| 10,167,813 | B2* | 1/2019 | Kohlenberg | B64D 33/04 |
| 10,184,483 | B2* | 1/2019 | Gallagher | F02C 3/04 |
| 10,184,511 | B2* | 1/2019 | Mano | F01D 17/162 |
| 10,196,926 | B2* | 2/2019 | Ketchum | F01D 21/00 |
| 10,215,053 | B2* | 2/2019 | Otto | F01D 25/18 |
| 10,215,055 | B2* | 2/2019 | Curlier | F01D 25/18 |
| 10,215,094 | B2* | 2/2019 | Merry | F02C 7/06 |
| 10,221,770 | B2* | 3/2019 | Sheridan | F02C 7/06 |
| 10,221,771 | B2* | 3/2019 | Roberge | F01D 25/16 |
| 2014/0064930 | A1* | 3/2014 | NguyenLoc | F01D 15/12 415/122.1 |

OTHER PUBLICATIONS

International Search Report with English Language Translation, dated Aug. 19, 2015, PCT Application No. PCT/FR2015/051162.

\* cited by examiner

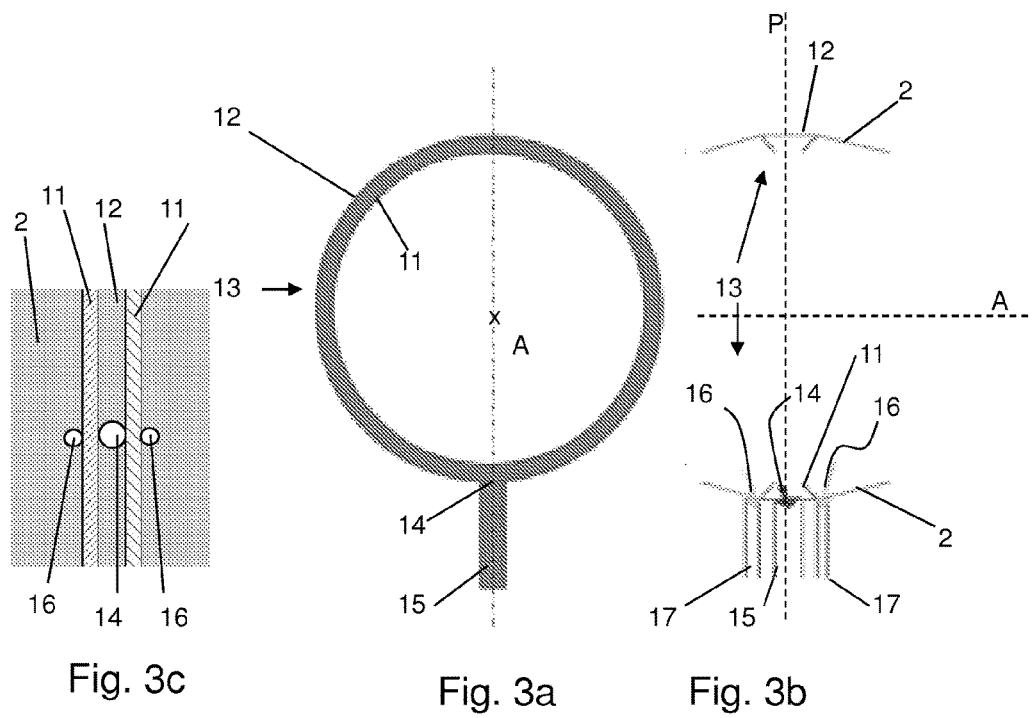
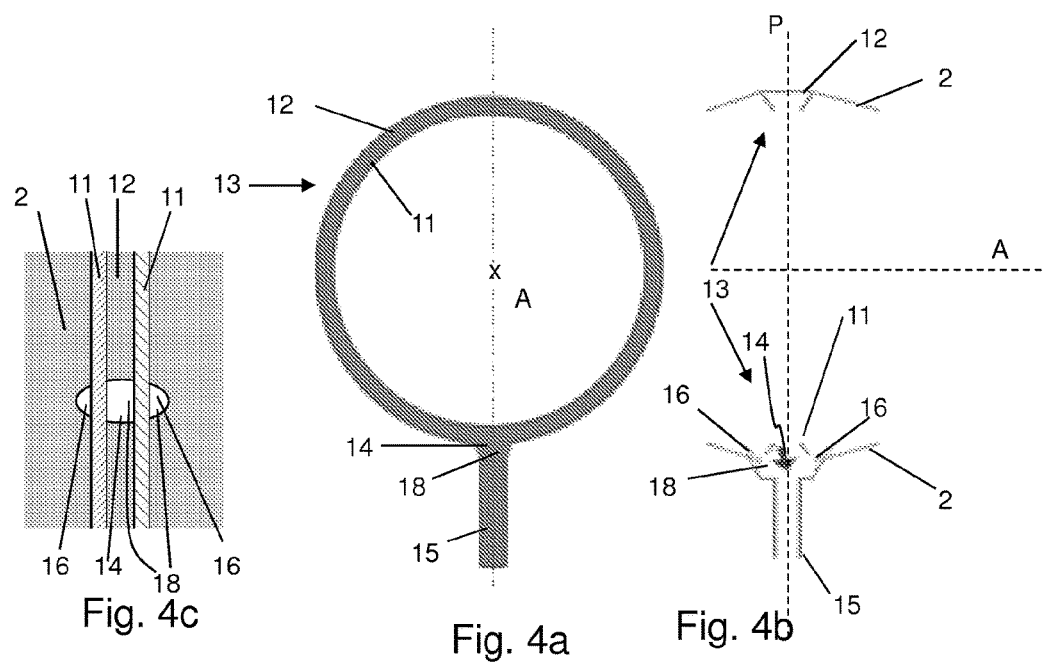
Fig. 3c  Fig. 3a  Fig. 3b
Fig. 4c  Fig. 4a  Fig. 4b

TURBINE ENGINE MODULE COMPRISING A CASING AROUND A DEVICE WITH A COVER FOR RECOVERING LUBRICATING OIL

FIELD OF THE INVENTION AND PRIOR ART

The present invention relates to the field of the lubrication of aircraft engines. It relates more particularly to a device for recovering the oil that has been used by a device comprising a rotating portion.

For example, a turboprop engine having contra-rotating propellers may incorporate a power gearbox in an enclosure for lubricating the bearings. Said enclosure is arranged to guide the oil leaving the devices contained in said enclosure towards storage means. Moreover, it is generally in communication with an oil separator of the air present in the oil circuit.

The power gearbox (referred to here as a PGB) requires a very large amount of oil, specifically over half of the total oil flow passing into the lubrication enclosure.

Furthermore, the PGB comprises a rotating gear system. According to the prior art, an annular cover extends around the PGB and is connected to a rotating portion of the PGB for conjoint rotation, in such a way that the cover itself rotates at high speed. The oil which lubricated the PGB exits therefrom at the periphery, through ports in the outer cover of the PGB. The oil passes through said ports by centrifugation and forms a stream which is widely dispersed in rotation and which will splash large amounts on all the walls of the recovery enclosure around the PGB.

Because of the large amount of oil and the dispersion of the splashes, the oil leaving the PGB may pose problems for the recovery thereof towards the means for discharging oil from the enclosure. There is therefore a risk of inadequate discharge, with the danger of oil refilling the enclosure and escaping through the seals and therefore sending oil into firing zones or flooding the PGB.

The object of the present invention is to propose a simple solution for effectively recovering the oil flow leaving a device, in particular a device rotating in a lubrication enclosure.

DISCLOSURE OF THE INVENTION

Accordingly, the invention relates to a turbine engine module comprising a device arranged so that the lubricating oil escapes therefrom by centrifugation about an axis of rotation, said device comprising at least one rotating portion and a cover rigidly connected to said rotating portion, said cover comprising radial through ports for the passage of the oil escaping by centrifugation and means for guiding the oil leaving said ports radially outwards, and a casing defining at least one portion of a lubrication enclosure of said device, said casing comprising at least one gutter, arranged to recover the oil passing through said radial ports and having a substantially annular shape centred on the axis of rotation, characterised in that the gutter comprises an annular bottom wall having at least one discharge port, and in that the casing comprises at least one other port located on the outside of the gutter, said at least one other port and said at least one discharge port being connected to common discharge means.

The oil leaving the ports is thus guided efficiently towards the recovery gutter, which allows better recovery of the oil and prevents the spraying of any other elements present around the device with oil that has lubricated the device. In particular, when the device is confined in an enclosure, this prevents the oil from spraying an extensive region of the inner walls of the enclosure then splashing or flowing over other elements such as the bearings, seals or pipes of the oil separator.

Lastly, the fact that the casing comprises at least one other port located on the outside of the gutter, said at least one other port and said at least one discharge port being connected to common discharge means, which moreover is directly in the region of the casing, allows common use of the pumps for driving the oil recovered in the enclosure which comes from the rotating device and from other devices contained in the enclosure.

Advantageously, said at least one discharge port is located substantially at the lowest point of the gutter. The location of the discharge port in the gutter can therefore be configured so as to break the oil ring and allow the fluid to be recovered more easily.

By definition, the gutter comprises side walls surrounding a cylindrical surface which forms the bottom wall. Said bottom wall is placed opposite the oil streams leaving the ports of the cover in order to intercept said streams. The side walls allow the splashes from the oil stream hitting the bottom wall to be recovered in order to confine said oil in the gutter.

Advantageously, the casing comprises a radially inner face defining a wall of the lubrication enclosure and forming the bottom wall of the gutter. This simplifies the production of the module by avoiding the need to mount the gutter on a flange, for example, in order to bring said gutter closer to the cover.

Advantageously, the gutter comprises two annular side walls which move away from each other radially outwards. The cross section of the gutter at the inlet for the oil ejected from the ports of the cover is therefore smaller than the surface area of the bottom wall that intercepts the oil stream. This limits the possibility of the oil splashes coming back out of the gutter, thus allowing better guiding of the oil ring rotating in the gutter so that said oil can then be discharged.

Each radial port of the cover may comprise a pipe, intended to form a means for guiding the oil.

The extension of the tubes outside the cover allows, among other things, the entrainment coefficient of the oil to be increased, up to a radius greater than that of the cover, as said oil comes out of the pipes. This then allows the circumferential speed of the oil to be increased and also allows the spread of the stream sprayed towards the wall of the enclosure to be reduced. Moreover, as this allows the outlet of the stream to be brought closer to the walls of the oil recovery enclosure, the size of the region where said oil must be recovered is reduced.

Preferably, the pipes extend radially outwards from the cover and slope in the same transverse plane and in the same direction about the axis of rotation.

Advantageously, in this case, the cover is configured so that the direction in which the pipes are oriented corresponds to the direction of rotation of the cover on the device in operation. Thus, the orientation of the pipes increases the tangential component of the oil sprayed onto an oil recovery wall. It can therefore form a rotating oil ring which will be guided more easily towards a discharge port.

Preferably, the transverse plane in which the pipes extend corresponds to the maximum radius of the annular casing.

The invention also relates to a turbine engine comprising such a module, device or cover.

BRIEF DESCRIPTION OF THE DRAWINGS

The present invention will be better understood, and other details, features and advantages of the present invention will become clearer upon reading the following description of a non-limiting example, with reference to the accompanying drawings, in which:

FIGS. 3a, 3b and 3c are schematic views of a first variant of an annular casing according to the invention, seen from the front, in axial section and from above for the bottom portion of the casing.

FIGS. 4a, 4b and 4c are schematic views of a second variant of an annular casing according to the invention, seen from the front, in axial section and from above for the bottom portion of the casing.

DESCRIPTION OF AN EMBODIMENT

Figure 1:
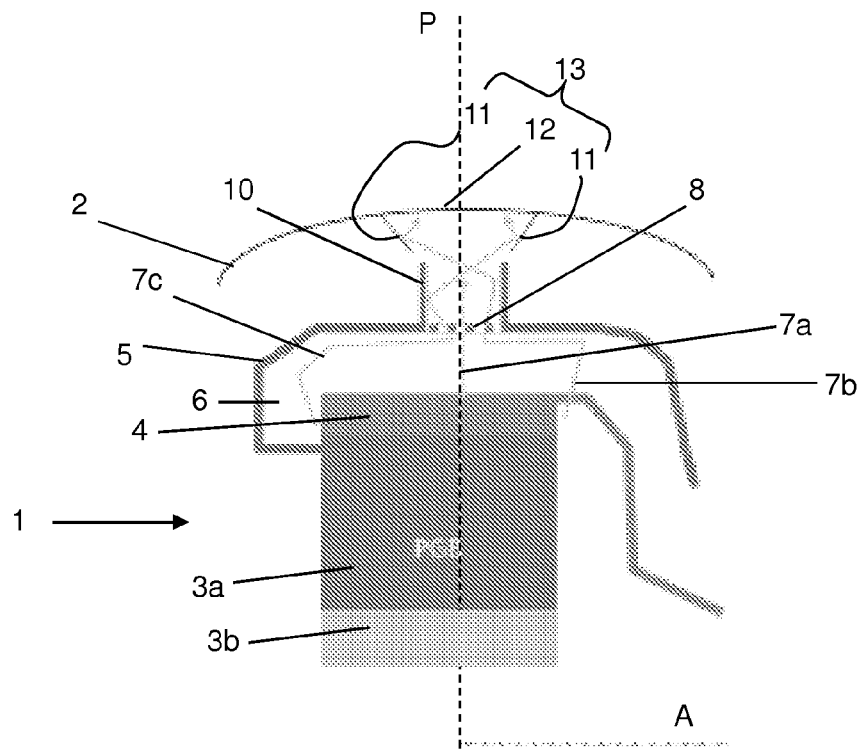
FIG. 1 is a schematic view of a turbine engine module according to the invention, said module comprising a rotating device, an annular cover and an annular casing, shown here in cross section along a half-plane passing through the axis of rotation of the device.

FIG. 1 shows a turbine engine device 1, which is mounted in an enclosure and is movable in rotation about an axis A. As can be seen in the drawing, the radial space requirement of the device 1 is generally significantly less than the space defined by the inner walls of the enclosure, said walls being formed by at least one annular casing 2 extending around the device 1.

In the example shown, said device 1 is a PGB. An oil inlet, not shown in the figure, takes oil into the central region of the PGB in order to lubricate said PGB. Said oil passes through various active portions of the PGB containing gears by means of centrifugal force. Said portions are shown schematically in the drawing by inner active portions 3a and 3b which rotate in one direction, surrounded by an outer active portion 4, which is contra-rotating.

In this example, in the case of a PGB having an epicyclic gear train, the innermost portion 3b shows a planetary input shaft in the form of a toothed wheel, which is fitted by a splined connection on the turbine shaft rotating in one direction of rotation while driving the PGB. The portion 3a shows a planet carrier supporting planet gears, of which there are at least three, for example, which are engaged about the input shaft 3b. The outer portion 4 shows an outer crown which is engaged in the planet gears. The dimensional ratios between the various elements are arranged, in this case, so that the outer crown 4 rotates in the opposite direction to the input shaft 3b, the planet gears rotating relative to the planet carrier 3a and setting said planet carrier, in this case, into rotation in the same direction as the input shaft 3b but at a different speed. This succinct description illustrates the fact that, in such a device, numerous parts are in contact with relative movements and significant forces, and this means that a large amount of oil is required for lubrication.

The PGB assembly is confined in a rotating outer annular cover 5. Said cover 5 is rigidly connected to the inner active portion 3a and therefore rotates in the opposite direction to the outer active portion 4 of the PGB. The cover 5 extends around and at a distance from the active portion 4 to form an inner cavity 6 which serves, among other things, to receive the lubricating oil leaving the PGB.

Having lubricated the active portions 3a, 3b and 4 of the PGB 1, the oil can exit therefrom by different paths 7a, 7b, 7c. The outer cover 5 is shaped to guide the oil coming from said different paths towards the outlet ports 8.

Said ports 8 are advantageously located in a region having the maximum radius of the cover 5 to promote the discharge of the oil by centrifugation. Further, there is generally a plurality of said ports, the number thereof varying for example from eight to seventy-five. Said ports are preferably distributed uniformly over the circumference in a plane P which is perpendicular to the axis of rotation A.

As shown in FIG. 1, the oil leaving the PGB 1 is ejected in a basically radial manner through the ports 8. However, various phenomena lead to the dispersion of the output stream. Firstly, the various paths 7a, 7b, 7c of the oil in the cavity 6 do not arrive at the port 8 at the same angle of incidence. Further, the effects of the oil flow interacting with the edges of the port 8 may deflect the output stream.

According to the invention, a pipe 10 is installed at the outlet of each port 8 on the outer face of the cover 5 of the PGB 1. The cross section of said pipe 10 corresponds in this case to that of the port 8 and use is made of the space between the cover 5 and the casing 2 of the enclosure to give a radial extension to the pipe 10, bringing the outlet thereof closer to the inner face of the casing 2 without touching said casing. Lastly, as shown in the axial section in FIG. 1, said pipes 10 are oriented substantially in the plane P which is transverse to the axis of rotation A. The cross section thereof is substantially constant along the radial extension thereof.

The pipes 10 may have been attached to the outer wall of the cover 5, being connected thereto by welding or brazing. Said pipes may also be integral with the cover 5, forming an integral unit therewith.

Moreover, use is made of the space remaining between the inner face of the casing 2 and the outlet of the pipes 10 to provide, on said inner face of the casing 2, an annular gutter 13 located in the same plane P. The annular gutter 13 extends around the axis of rotation A. The annular gutter 13 comprises two annular side walls 11, which are symmetrical relative to the plane P, and an annular bottom wall 12.

Advantageously, the shape of the casing 2 in the vicinity of the plane P and that of the bottom wall 12 have substantially circular cross sections. This ensures that the ends of the pipes 10 of the cover 5 are at a constant distance from the gutter 13 during the rotation of said ends.

Advantageously, the plane P is located at the maximum radius, so that the oil can be recovered more easily.

In axial section, in FIG. 1, the inner peripheral edges of the annular side walls 11 define therebetween an annular opening of the gutter 13, which is aligned radially with the outlets (radially outer ends) of the pipes 10. The opening has a width or axial dimension that is substantially equal to or slightly greater than the diameter of the pipes 10, which are preferably substantially equal.

As in the example shown, the side walls 11 move away or diverge from one another radially outwards. Said walls define therebetween the bottom wall 12, the inner faces thereof being oriented towards said bottom wall 12.

In the example, said bottom wall 12 is produced by a portion of the inner wall of the casing 5 to which the annular side walls 11 are connected. In this case, the annular side walls 11 may have been attached to the inner wall of the casing 2, being connected thereto by welding or brazing. Said walls may also be integral with the casing 2, forming an integral unit therewith.

As shown in FIG. 1, the oil leaving in different directions about the transverse plane P at the outlet of the ports 8 initially meets the inner walls of the pipes 10. Depending on the paths taken, deflection may send the oil directly towards the bottom wall 12 of the gutter 13. The direction of the oil flow may be even more parallel to the plane P after deflection as the edges of the pipes 10 give a strong radial impulse, driven by the rotation of the outer cover 5.

As can be seen, for some paths 7a, 7b, the deflection of the oil onto the walls of the pipes 10 may not be enough to direct said oil towards the bottom wall 12 of the gutter 13. In this case, it is the side walls 11 that intercept the oil and send it back towards the bottom wall 12. The sloping shape of the walls 11 may also have an additional function, not shown in the drawing, of capturing the splashes from oil streams directly hitting the bottom wall 12 of the gutter 13.

Thus, with the tangential impulse caused by the rotation of the cover 5, a rotating ring of oil can be formed against the bottom wall 12 of the gutter 13. The oil is therefore channelled and pressed firmly against the bottom wall 12 of the gutter 13 by centrifugal force. With reference to FIGS. 3a and 4a, this allows the oil to be recovered by placing a discharge port 14 in the lowest point of the bottom wall 12.

Figure 2:
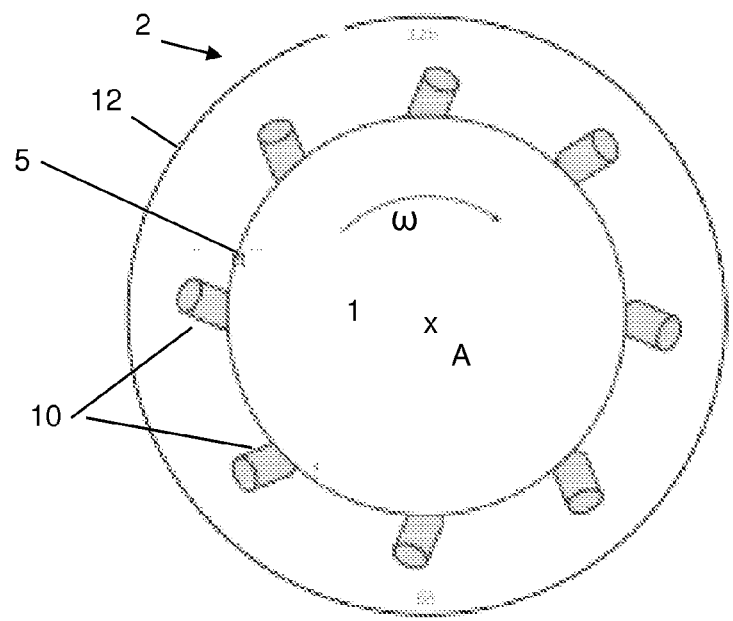
FIG. 2 is a schematic front view of the cover and the annular casing from FIG. 1.

With reference to FIG. 2, said rotational effect of the oil ring can be improved by sloping the pipes 10 in the direction of rotation ω of the cover 5 when the PGB is operating relative to the radius in the transverse plane P.

With reference to FIGS. 3a and 4a, a port 14 is placed in the bottom wall 12 of the gutter and communicates with a recovery channel 15, which itself communicates with a pump, not shown, to drive the recovered oil. Said channel 15 forms, together with the pump, a means of discharging the recovered oil into the gutter 13.

Taking the example of the PGB 1 in a contra-rotating turboprop engine, the axis of rotation A of the PGB 1, which corresponds to that of the turboprop engine, is generally substantially horizontal. The recovery port 14 is therefore located in the bottom portion of the gutter 13 so that the oil can flow thereto by means of gravity, in particular when the turboprop engine stops. Using the analogy of the dial of a clock, the port 14 can be said to be located at six o'clock around the axis A. The location of the discharge port 14 allows said port to have a general shape that forces the discharge of the oil and thus prevents the oil from accumulating and forming a ring.

Furthermore, with reference to FIGS. 3b and 4b, the enclosure generally contains other devices, not shown, such as bearings for guiding shafts. Since the low point of the gutter 13 is generally also the low point of the enclosure, ports 16 are made in the walls of the casing 2 to discharge the oil coming from said devices and flowing over the inner walls of the enclosure. The discharge holes 16 and 14 are advantageously placed at the greatest radius of the annular casing 2, so that the oil is carried thereto by gravity.

In a first variant, shown in FIGS. 3a to 3c, the ports 16 are made in the walls of the casing 2 on the outside of the annular side walls 11 of the gutter 13 which stop the oil coming from the other devices. Said ports 16 correspond to channels 17 opening into the lubrication enclosure. Said channels 17, advantageously having dedicated pumps, not shown, to which said channels are connected, form means for discharging the oil from devices other than the PGB.

In said first variant, the port 14 of the gutter does not communicate with the port or ports 16 of the casing 2, on the outside of the gutter 13. The channels 15, 17, which are connected respectively to said ports 14, 16, therefore advantageously correspond to independent or separate discharge means. It would be possible to group the channels 15 and 17 together before the connection of the recovery pump.

In a second variant, shown in FIGS. 4a to 4c, the ports 16 of the casing 2 on the outside of the gutter are placed in communication with the channel 15 in which the oil coming from the gutter 13 flows. This may be carried out by means of a small collecting cavity 18, opening in the low point of the casing 2, the axial extension of which is greater than the width of the bottom wall 12 of the gutter. The ports 14, 16 in the bottom wall 12 of the gutter and in the casing 2 on the outside of the gutter 13 are formed by the opening of said collecting cavity 18 in the casing 2 and are separated by the side walls 11 of the gutter 13. The channel 15 opens into the bottom of said collecting cavity 18.

It would also be possible for the discharge holes 16 to be located in a different casing from that in which the discharge holes 14 are located. Thus, the oil leaving the PGB would be discharged through the discharge hole 14 which would fall into a region 18, in another casing. In said region 18, the oil from the PGB and from the other elements would be mixed and discharged by means of the channel 15.

This arrangement allows the pumps driving the recovery oil to be made common.

Details of the implementation of the invention have been given in the case of a PGB installed in a turboprop engine, but clearly said invention can be implemented to recover lubricating oil in any rotating device inside an enclosure.

The invention claimed is:

1. A turbine engine module comprising a device arranged so that the lubricating oil escapes therefrom by centrifugation about an axis of rotation, said device comprising at least one rotating portion and a cover rigidly connected to said rotating portion, said cover comprising radial through ports for the passage of the oil escaping by centrifugation and means for guiding the oil leaving said ports radially outwards, and a casing defining at least one portion of a lubrication enclosure of said device, said casing comprising at least one gutter, arranged to recover the oil passing through said radial ports and having a substantially annular shape centred on the axis of rotation, the gutter comprising an annular bottom wall having at least a first discharge port, wherein the casing comprises at least a second discharge port located on the outside of the gutter, and in that said device comprises discharge means, said at least second discharge port and said at least first discharge port being connected to the discharge means that are common wherein at least one discharge port is located substantially at the lowest point of the gutter.

2. The turbine engine module extending according to claim 1, in which the casing comprises a radially inner face defining a wall of the lubrication enclosure and forming the bottom wall of the gutter.

3. The turbine engine module according to claim 1, in which the gutter comprises two annular side walls which advantageously move away from each other radially outwards.

4. The turbine engine module according to claim 1, in which each radial port of the cover comprises a pipe, intended to form a means for guiding the oil.

5. The turbine engine module according to claim 4, in which the pipes extend radially outwards from the cover and slope in the same transverse plane and in the same direction about the axis of rotation.

6. The turbine engine comprising a module according to claim 1.

* * * * *